INVENTOR
Nathan Rynn
BY
Olin C. Mitchell
ATTORNEY

Nov. 23, 1954 N. RYNN 2,695,330

COLOR TELEVISION

Filed May 8, 1950 2 Sheets-Sheet 2

INVENTOR
Nathan Rynn
BY Oliver Mitchell
ATTORNEY

United States Patent Office 2,695,330

Patented Nov. 23, 1954

2,695,330

COLOR TELEVISION

Nathan Rynn, Princeton, N. J., assignor to Radio Corporation of America, a corporation of Delaware Application May 8, 1950, Serial No. 160,632

4 Claims. (Cl. 178—5.4)

This invention relates to apparatus for controlling the color balance in color television receivers.

In accordance with one basic system for televising colored images, the transmitted signal successively represents the intensities of the component colors being employed. For example, the information transmitted during one instant of time might correspond to the red light component of red light in an element of the image to be televised and during succeeding instants of time may correspond to the green and blue colors of the image. At the receiver, a signal distributor applies all the signals corresponding to the red information to means for reproducing red light and all the signals corresponding to the green information to means for reproducing green light. The signals representative of the blue light are applied to means for reproducing blue light.

In any color television system, proper balance between the various component colors is required. This means that a signal of a given amplitude should reproduce the same light intensity in each of the means for reproducing the separate component colors. In accordance with present practice, the component colors are reproduced by employing different kinds of phosphors and exciting them with electrons. It often occurs that the light emission of these different phosphors is not the same for various reasons. Furthermore, this light emission may vary from one batch of phosphor to another.

It is therefore an object of this invention to provide an improved signal distributor. It is therefore the object of this invention to provide an improved means whereby the color balance of a color television receiver of the sequential type may be improved.

Therefore, in accordance with this invention, means are provided for varying the intensity of the excitation of the different phosphors so as to compensate for any differences in light emission. For example, if the green phosphor produces a large amount of light as compared to the red and blue phosphors, the intensity of the excitation of the red and blue phosphors is increased so that the proper color balance is attained.

Briefly speaking, this objective is obtained in the following manner. Color television receivers of the type adapted to reproduce images from signals that sequentially represent the different component colors normally are provided with a distributor having a sampling oscillator. This oscillator is synchronized with a sampling oscillator at the television transmitter. The frequency of these sampling oscillators is equal to the repetition frequency of the sequence of the component colors. If three component colors are used, the third harmonic of sampling frequency is employed to key the beam of electrons so that it stimulates a particular phosphor only when the transmitted signal corresponds to the color that is reproduced by that phosphor. By combining the fundamental frequency with the harmonic in different proportions and phase, the keying pulses at the harmonic frequency can be varied in amplitude so as to compensate for the differences in the efficiencies of the phosphors. The combining can take the form of multiplying or modulating, adding, or a combination of both.

These and other objects and advantages will become apparent from a detailed consideration of the drawings in which.

Figures 1, 1A, 3:
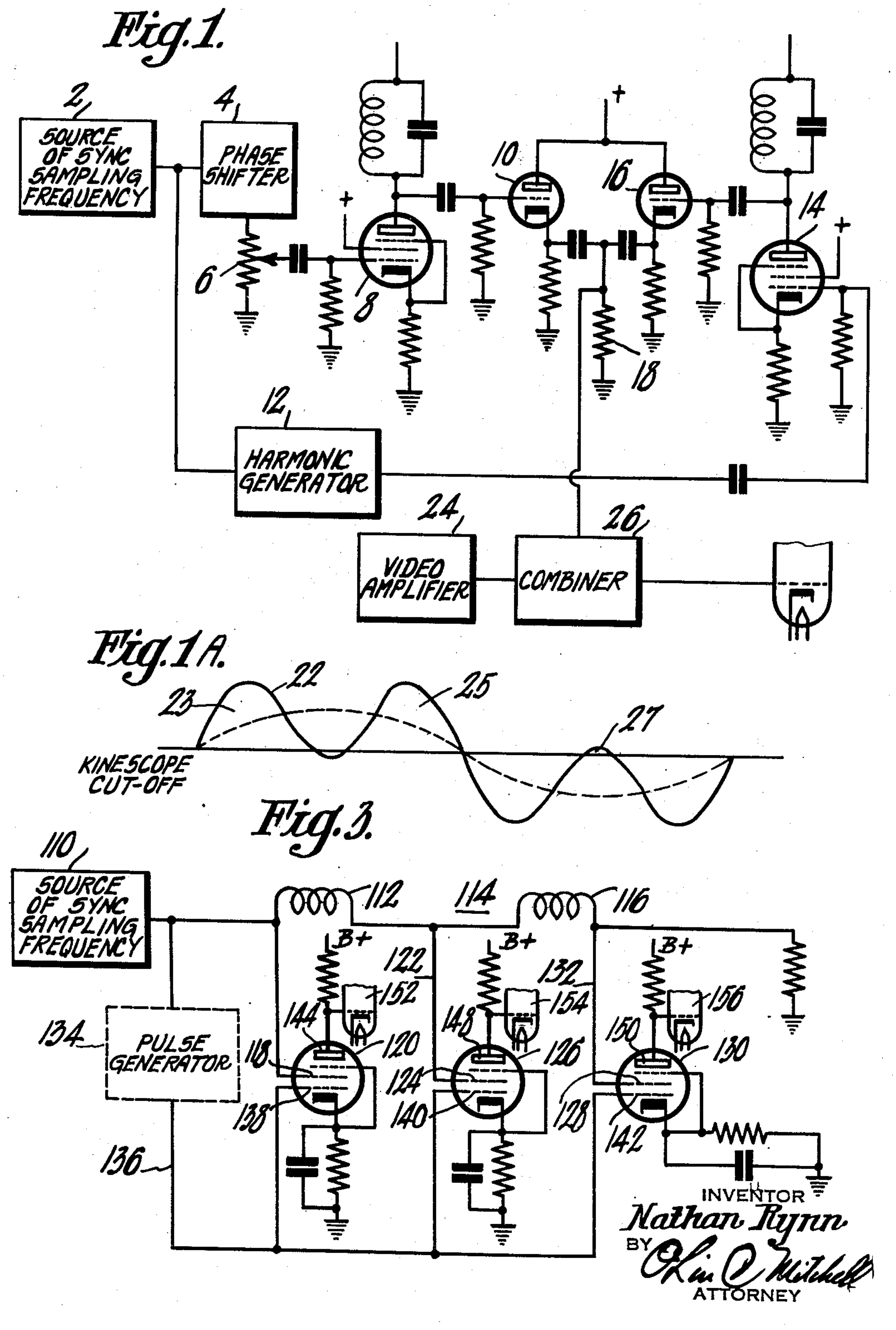
Figure 1 illustrates an electronic circuit arrangement for combining the fundamental sampling frequency with a harmonic of this frequency.
Figure 1A illustrates graphically how the amplitude of the keying signals occurring at the harmonic frequency are changed relative to one another by the presence of the fundamental frequency.
Figure 3 illustrates how this invention could be applied to means for reproducing colored images that employ more than one electron beam.

Referring in detail to Figure 1, there is shown a circuit arrangement for mixing the sampling frequency of a single color with an harmonic of this frequency in accordance with the principles of this invention. Voltage waves of the fundamental sampling frequency that are synchronized with the sampler at the television transmitter are provided by a source 2. In most applications the synchronized frequencies are the same as the sampling frequency for any given color for it lies within the pass band of the transmission system, whereas the sampling frequency of each successive color lies outside this band. The manner in which this synchronization is obtained is not a part of this invention. One method of synchronization is found in the RCA publication entitled "Synchronization for Color Dot Interlace in the RCA Color Television System." After passing through any suitable phase shifter 4, these voltage waves are applied to a potentiometer 6. The potentiometer is connected to an amplifier generally indicated by the numeral 8. The output of the amplifier 8 is coupled to one tube 10 of a two-tube adder. In this way, varying amounts of the fundamental of the sampling frequency can be applied to the adder at any desired phase.

The output of the source 2 is also applied to a harmonic generator 12. In the event that three component colors are employed in the television system with which the receiver is to cooperate, the harmonic generator 12 will be a frequency tripler. Various forms of harmonic generators are known in the prior art. For example, it may be comprised of an amplifier operated in class "C" having a plate circuit that is resonant to the desired harmonic. The output of the harmonic generator 12 is applied via a suitable amplifier 14 to another tube 16 of the adder. In the illustrated example, the cathodes of the tubes 10 and 16 are each coupled to an output load resistor 18 via a condenser.

*Operation*

The voltage wave appearing at the top of the resistor 18 is illustrated in Figure 1A wherein the solid curve 20 represents the sampling frequency of a single color and the solid curve 22 the third harmonic of this frequency. It will be remembered that information as to all colors is transmitted during one cycle of the sampling frequency of a single color. If a three-color system be employed, therefore, the third harmonic is employed to do the actual sampling. For example, the color reproduced by the receiver in response to the first pulse 23 might be red and the color reproduced by the pulse 25 might be green, and the third pulse 27 might occur during the time the blue information is present in the received wave. The amplitudes of these pulses are seen to be different and their peaks are determined by the amount of fundamental that is present. This wave is then combined with the video signal from the source 24 in a combiner 26. The output of the combiner 26 is applied to a control electrode of a kinescope or kinescopes that is adapted to reproduce the colored image.

If the combiner 26 takes the form of an adder, the pulses 23, 25 and 27 will merely be added to the video signal. This, in effect, changes the background levels of the means reproducing the different component colors. The relative values of these background levels depend on the relative amplitudes of the pulses.

Whereas adding the video signals and the pulses improves the color balance within a limited range of intensities, this range can be extended by making the amplitude of the pulses vary with the amplitude of the video signals. Assume, for example, that the red phosphor produces one half as much light for any given stimulus as the green phosphor. Color balance for all ranges of intensities of red is obtained by effectively doubling the amplitude of the video signals corresponding to the red video information. Now the blue phosphor might emit only one-third the amount of light as the green phosphor. Therefore, the blue video signals should be tripled in amplitude to effect color balance. The relationship between the signals applied to the kinescope for the same intensities of the different colors is established by the relative amplitudes of the pulses 23, 25 and 27. If the combiner 26 multiplies, the video signals and the pulses, color balance is achieved for all intensities. Among the various types of multipliers known are those shown on pages 668–670 of a book entitled "Waveforms" published in 1949 by McGraw-Hill as one of the Massachusetts Institute of Technology Series. If any signal is zero, the signal applied to the kinescope can be adjusted to the black level. In this way, all half tones are available and there is no component in the reproduced image that varies as the pulses 23, 25 and 27 are repeated.

Figures 2, 2A:
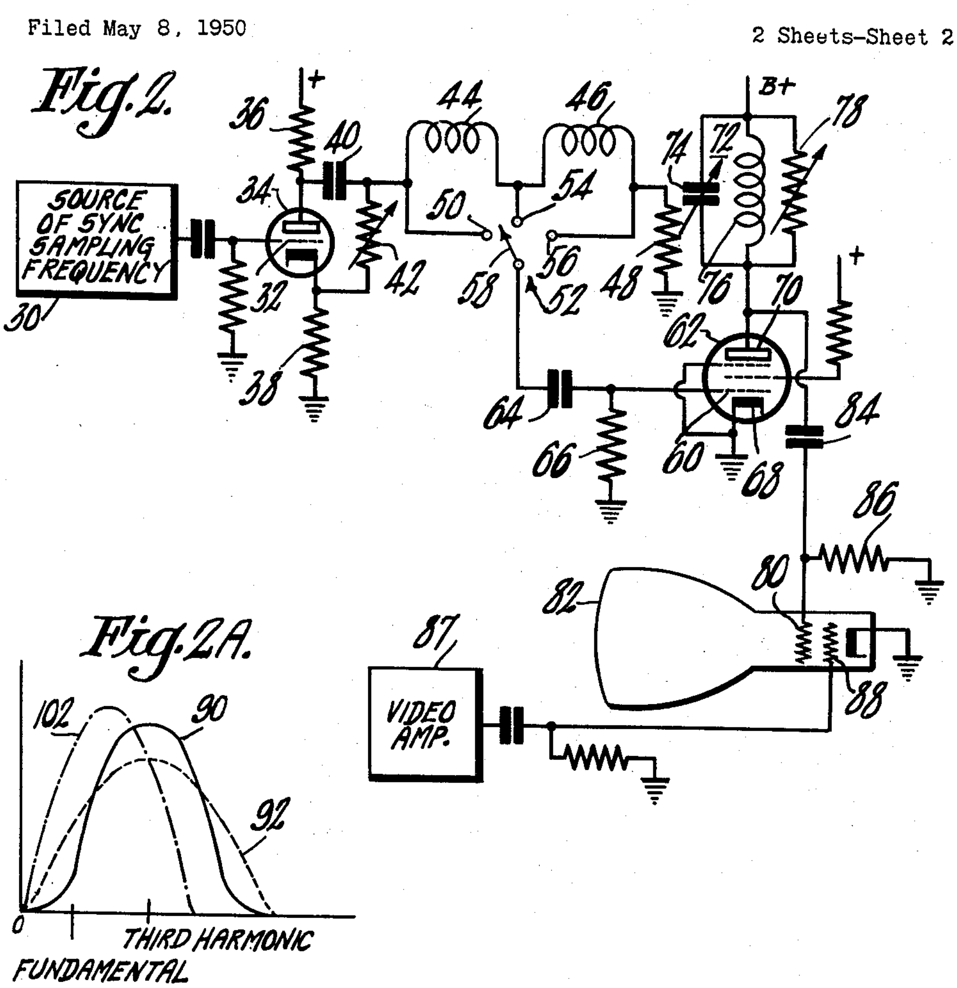
Figure 2 shows another apparatus for controlling color balance in accordance with the principles of this invention.
Figure 2A illustrates graphically the operation of certain components of the apparatus shown in Figure 2.

A somewhat different apparatus for obtaining the proper color balance is illustrated in Figure 2. Voltage waves of the single color sampling frequency are supplied by the source 30 to the grid 32 of a continuous phase shifting tube 34. The plate of the tube 34 and the cathode are each connected to equal resistors 36 and 38 respectively. A condenser 40 and a variable resistance 42 are connected in series between the plate of the amplifier and the cathode. An intermittent phase shifting device is coupled to the junction between the condenser 40 and the variable resistance 42. The intermittent phase shifting device shown in Figure 2 is for use with a color television system adapted for employing three component colors. It is comprised of a delay line having a section 44 that delays the voltage waves applied to it by 120° and a similar section 46 that further delays this voltage by another 120°. This delay line is connected to ground through a suitable terminal resistor 48 which prevents undesired reflections.

The output of the continuous phase shifting tube 34 is connected to the terminal 50 of a switch 52. A point intermediate the sections 44 and 46 of the delay line is connected to the terminal 54, and the top of the resistor 48 is connected to the terminal 56. The rotary switch member 58 is coupled to the grid 60 of a class "C" amplifier 62 via a condenser 64 and a grid leak resistor 66. The cathode 68 of the class "C" amplifier 62 is connected to ground. The plate 70 of the class "C" amplifier 62 is connected to a suitable B+ potential via a parallel resonant circuit 72. This circuit is tuned by variable trimmer condenser 74 that is parallel with the inductance 76. Its "Q" is controlled by the parallel variable resistor 78.

The plate 70 of the class "C" amplifier 62 is coupled to a control electrode such as the screen grid 80 of the cathode ray tube 82 via a coupling condenser 84 and a grid leak resistor 86. The video signals derived from the video amplifier are applied to the grid 88 in the customary manner. The relative amplitudes of the stimulus given the phosphors is controlled by the pulses applied to the grid 80. As these pulses effectively change the gain of the tube, the video signals are correspondingly amplified by a greater or lesser amount. Thus, color balance is achieved over a wide range of intensities.

*Operation of the circuit of Figure 2*

The operation of the circuit just described will now be explained in connection with Figures 2A and 2B. Figure 2A illustrates the overall responses of the tuned circuit 72 under various conditions. The solid curve 90 of Figure 2A illustrates the response of the tuned circuit 72 when the trimmer condenser 74 makes the circuit resonant to the third harmonic of the fundamental sampling frequency. Under these conditions, it is seen that the amount of fundamental that will appear across the tuned circuit 72 is extremely small. If now, the variable resistance 78 is reduced in value, the response characteristic will be like that shown by the dotted curve 92. Although it is still peaked at the third harmonic frequency, it is generally broader than the curve 90 for reasons well known to those skilled in the art. It can therefore be seen that the amount of fundamental frequency appearing across the tuned circuit 72 can be controlled by adjusting the resistance 78.

Figure 2B:
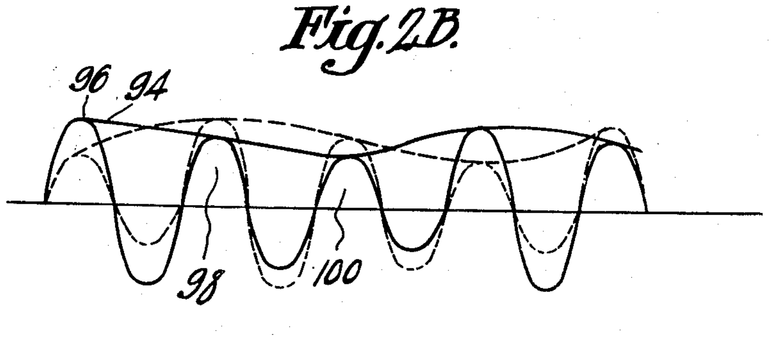
Figure 2B illustrates graphically how certain adjustments in the circuit of Figure 2 affect the relative amplitudes of the keying pulses occurring at the harmonic frequency.

When the value of the resistance 78 is fairly small, the third harmonic voltages appearing across the tuned circuit 72 will be rather highly damped, as illustrated by the Figure 2B. In this figure the solid line 94 shows the fundamental sampling frequency component that is effectively introduced across the tuned circuit 72 by this damping action. Actually, the curve 94 is not a sine wave, as it follows the exponential decay of the tuned circuit, but it does have a strong component of the amount sampling frequency. During the pulse 96, the tuned circuit 72 receives energy because the fundamental sampling frequency exceeds the cut off bias established on the tube 62 by the action of the condenser 64 and the resistor 66. However, as the circuit 72 continues to oscillate, its voltage swings become less and less, as shown by the pulses 98 and 100.

Similar results may be obtained by substantially detuning the tuned circuit 72 with the variable capacitor 74. A curve illustrating this method is shown in Figure 2A in dash-dot lines and is indicated by the numeral 102. The peak of this curve is shown to occur somewhat below the third harmonic frequency. By varying the tuning it can be seen that the response of the circuit to the fundamental can be varied. In this way, different amounts of the fundamental can be applied to the grid 80 of the cathode ray tube 82.

When the circuit is de-tuned by the method just described, there is an accompanying change in phase of the fundamental that appears across the tuned circuit 72. As has been noted before, however, it is necessary that the phase of the samples produced by the pulses 96, 98 and 100 be precisely synchronized with the sampling that is performed at the transmitter. Therefore, any change in the synchronization that is produced by the de-tuning of the tuned circuit 72 may be compensated for by the adjustment of the resistor 42 that is in circuit with the continuous phase changer 34 of Figure 2.

If it is desired to shift the phase of the pulses 96, 98 and 100 so that pulse 98 is the largest, the arm 58 of the intermittent phase shifter is advanced one position. Then the pulses will be such as indicated by the dotted lines of Figure 2B.

Regardless of the methods by which the amplitudes of the pulses 96, 98 and 100 are controlled, they must be combined with the video signals in a proper manner. For example, assume that the phase of the pulse 96 of Figure 2B is such that it occurs at the same time the video signal provided by the video amplifier 87 is supplying red information and that the pulse 98 occurs when the video amplifier 87 is supplying green information, and further, that the pulse 100 occurs when the video amplifier is supplying blue information. As the pulses are effectively combined with the video signal by the action of the screen grid 80, this means that the red pulses will be emphasized more than the green and the green will be emphasized more than the blue. Thus, if the cathode ray tube 82 directs its beam against a red phosphor when the pulse 96 occurs, this phosphor will be more strongly excited than the green phosphor. Similarly, the green phosphor is struck by a beam of electrons when the pulse 98 is present and therefore, it, in turn, is excited more strongly than the blue phosphor which is struck by the beam of electrons when the pulse 100 is present on the screen grid 80.

The manner in which the cathode ray tube operates to cause its beam of electrons to strike a particular phosphor when a particular one of the pulses 96, 98 or 100 is present on the screen grid 80 is not a part of this invention and therefore need not be described in detail. As was shown in connection with the discussion of Figure 1, however, the pulses corresponding to 96, 98 and 100 may be combined with the video signals before being applied to the kinescope. In the arrangement of Figure 2 this combination is effected in the cathode ray tube itself.

It has been stated above that the delay line consisting of two sections 44 and 46 is of the intermittent type. That is to say, the phase of the fundamental sampling frequency is changed abruptly by 120° by the rotation of the switch member 58 from one contact to another. The phase of the pulses 96, 98 and 100 is changed by three times the phase change of the fundamental. Therefore, upon moving the switch member 58 from contact 50 to contact 54, the fundamental is changed by 120° and the pulses 96, 98 and 100 are changed by 360°. Therefore, the phase of the pulses is not effectively changed. However, their relative amplitudes will be changed as indicated by the dotted curves of Figure 2B. The pulse 96 that corresponded to the red video information is now seen to have a smaller amplitude than previously. The pulse 98, on the other hand, is seen to have increased in amplitude. Such an intermittent phase changer is therefore useful if it is desired to accentuate the excitation of a different color. This condition may arise because of the change in the light emission efficiency of the phosphors on two different cathode ray tubes.

*Invention applied to a multi-beam tube*

In the arrangement shown in Figure 3 the fundamental sampling frequency is supplied by a source 110. As previously explained, this frequency is synchronized with the sampling at the transmitter. The fundamental sampling wave is delayed by 120° by a section 112 of a delay line 114. It is further delayed by 120° by another section 116 of this delay line. In this way, the fundamental of the sampling frequency is available at three different phases separated from each other by 120°. The zero phase or neutral phase is applied to the grid 118 of a keying tube 120. The phase that lags by 120° is supplied via lead 122 to the grid 124 of the keying tube 126. The phase that lags by 240° is applied to a grid 128 of a keying tube 130 via a lead 132.

The output of the source of the synchronized fundamental of the sampling frequency 110 is also supplied to an apparatus 134 where it is mixed with one of its harmonics. The device 134 may be the same as that illustrated in Figure 1. The output is connected via bus 136 to the control grids 138, 140, and 142 of the keying tubes 120, 126 and 130. The plates 144, 148 and 150 of the keying tubes 120, 126 and 130 respectively are connected to control electrodes 152, 154 and 156. These electrodes control the intensity of separate electron beams. These beams may be enclosed within one evacuated envelope or they may be the beams of separate cathode ray tubes.

The operation of the arrangements of Figure 3 is as follows: During the positive peak of the fundamental sampling frequency, each of the keying tubes 120, 126 and 130 will be rendered conductive. However, due to the phase displacements effected by the delay line 114, the operation of the keying tubes will be brought about in sequence. Since this phase displacement of the fundamental by the delay line 114 is at 120° intervals or the fundamental sampling frequency, each of the keying tubes 120, 126 and 130 is turned on when one of the pulses illustrated in either of the Figures 2B or 1A are provided by the device 134. Assuming that these pulses have the forms shown in Figure 2B, this means that the pulses 96 will be applied to the grid 138 of the keying tube 120 when this tube is conductive. If this pulse 96 occurs at the same time that the video information is representative of the red content of the image, then the beam of electrons controlled by the electrode 152 should strike the red phosphor. In a similar way, the pulse 98 of Figure 2B will be applied to the grid 140 of the tube 126 when it is rendered operative and the electron beam being controlled by the electrode 154 should strike a green phosphor. Similarly, a pulse 100 of Figure 2B is applied to the grid 142 of the keying tube 130 so as to control the intensity of the beam striking a blue phosphor. As pointed out above, these beams could be in separate tubes or they could be enclosed in a single envelope. The video information would be merely added to the pulses 96, 98 and 100 if the device 134 is like the arrangement of Figure 1. Therefore, the effect of the red signals would be emphasized with respect to the effect of the green and the blue signals. Likewise, the effect of the green signals would be accentuated with respect to the effect of the blue signals.

Having described my invention, what is claimed is:

1. An apparatus for controlling the color balance of a device adapted to reproduce colored images from a signal that sequentially corresponds to the intensities of a plurality of component colors comprising in combination a source of voltage waves that pass through one cycle for each sequence of the component colors, a harmonic generator connected to the output of said source, means for adding the harmonic provided by said harmonic generator and said voltage waves, a source of video signals, a combiner for adding the output of said combining means and said video signals, and a kinescope having a beam intensity controlling electrode, the output of said combiner being applied to said electrode.

2. An apparatus for varying the intensity of a cathode ray beam of a cathode ray image reproducing tube having an electrode for controlling the intensity of the beam in a repetitive manner as signals representing successive samples of the different selected component colors employed in a color transmission system are received comprising in combination a source of voltage waves of a frequency equal to the frequency of occurrence of the samples of any one color, a first phase changer coupled to the output of said source and adapted to be adjusted to provide any phase of the voltage wave applied to it within predetermined limits, an intermittent phase changer, means for coupling the output of said first phase changer to the input of said intermittent phase changer, a harmonic generator coupled to the output of said intermittent phase changer, said harmonic generator being adapted to pass at least a portion of the voltage wave applied to it, and means for coupling the output of said harmonic generator including the voltage wave and the generated harmonic to said electrode for controlling the intensity of the cathode ray beam.

3. An apparatus for controlling the color balance of a cathode ray beam device adapted to reproduce colored images from a signal that sequentially corresponds to the intensities of a plurality of component colors comprising in combination a source of sampling voltage waves that pass through one cycle in each sequence of component colors, a source of a harmonics of said sampling voltage waves, the harmonic being such that it goes through the same number of cycles during one cycle of said sampling voltage waves as there are component colors in a sequence, means for shifting the phase of said voltage waves with respect to the output of said harmonic generator, means for combining said sampling voltage wave and said harmonic wave so as to form a control wave and means for controlling the intensity of said cathode ray beam in response to each peak of said control wave.

4. Apparatus for securing proper color balance in an image reproducing system adapted to operate in response to color signals that sequentially represent the different component colors and employing a plurality of electron streams, each stream being directed so as to strike different color responsive phosphors comprising in combination a source of alternating current voltage waves, the frequency of said waves being such that one cycle corresponds to the time the color signals pass through one sequence, a plurality of keying tubes each of said keying tubes being biased to cut off and having at least two control electrodes, means for supplying said voltage waves to one grid of each keying tube in different phases, said phases being such that the crest of the voltage wave applied to each grid coincides with the time when the color signal represents a different color, means for deriving a harmonic of said voltage wave, said harmonic being such that it passes through one cycle each time the color signal changes from representing one color to another, means for combining said harmonic and said voltage waves, and means for coupling the output of said combining means to each of the other grids of said keying tubes.

References Cited in the file of this patent

UNITED STATES PATENTS

| Number | Name | Date |
|---|---|---|
| 2,431,115 | Goldsmith | Nov. 18, 1947 |
| 2,471,253 | Toulon | May 24, 1949 |
| 2,479,880 | Toulon | Aug. 23, 1949 |
| 2,543,772 | Goldmark | Mar. 6, 1951 |